United States Patent [19]
Dalley

[11] 3,872,391
[45] Mar. 18, 1975

[54] BALANCED LINE DRIVER

[75] Inventor: James Edwin Dalley, Sherrelwood Estates, Colo.

[73] Assignee: Bell Telephone Laboratories, Incorporated, Murray Hill, N.J.

[22] Filed: Jan. 16, 1974

[21] Appl. No.: 433,657

[52] U.S. Cl. .................... 330/14, 330/17, 330/116, 330/117
[51] Int. Cl. .................... H03f 3/04
[58] Field of Search .................... 330/13, 14, 15, 17, 22, 330/116, 117

[56] References Cited

UNITED STATES PATENTS 3,714,597 1/1973 Reynolds .................... 330/15 X

*Primary Examiner*—R. V. Rolinec
*Assistant Examiner*—Lawrence J. Dahl
*Attorney, Agent, or Firm*—Donnie E. Snedeker

[57] ABSTRACT

A balanced line driver of the type having first and second transistor output stages respectively adapted for driving first and second sides of a balanced line. The first output stage drives the first side of the line directly in response to the driver input signal while current repeater circuitry in the driver establishes a master-slave relationship between the first and second output stages so that the second output stage drives the second side of the line in response to the current on the first side of the line.

10 Claims, 1 Drawing Figure

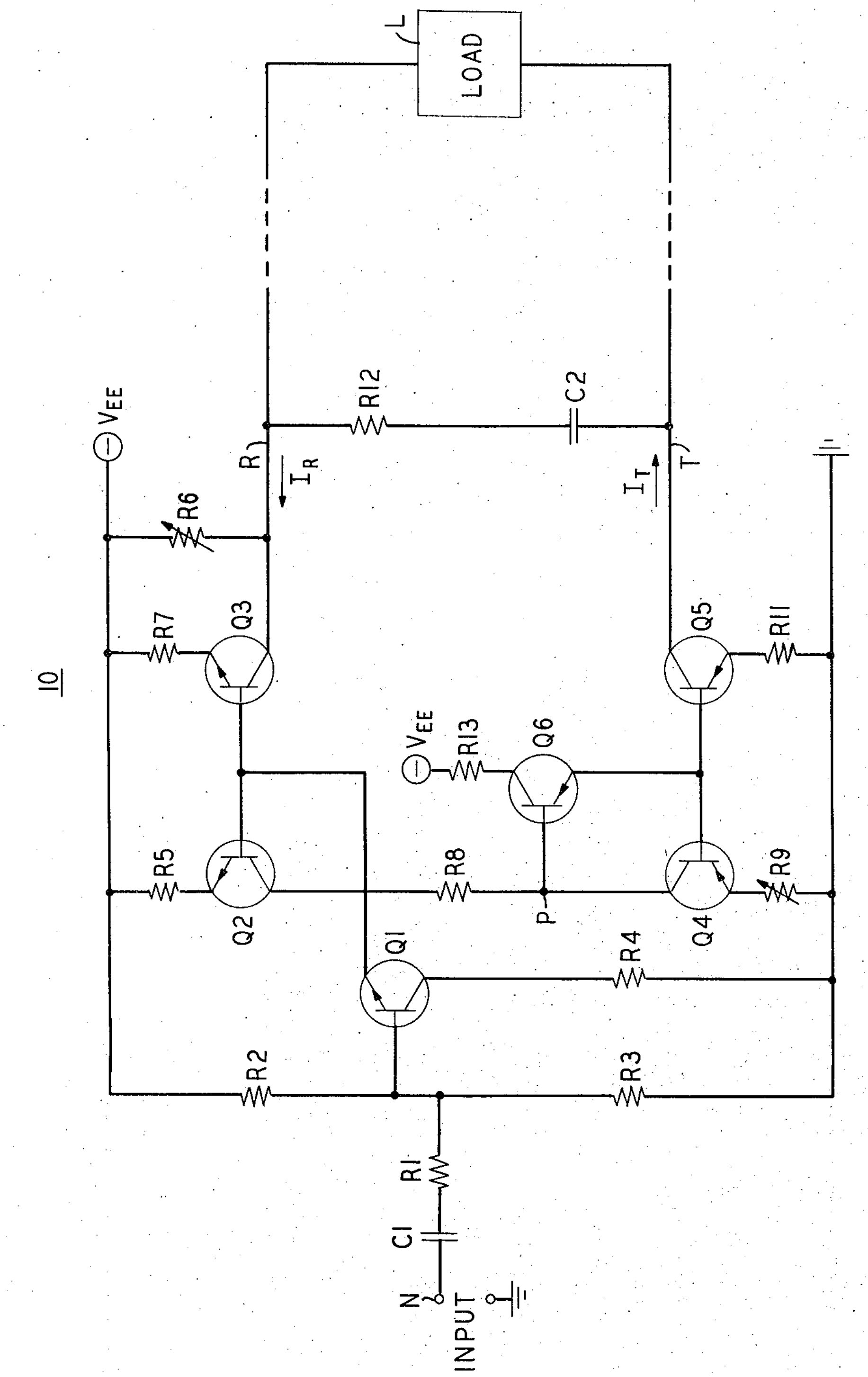
10
LOAD
L
R12
C2
VEE
R6
R
IR
IT
T
R7
Q3
Q5
R11
VEE
R13
Q6
R5
R8
R9
Q2
P
Q4
Q1
R4
R2
R3
R1
C1
N
INPUT

BALANCED LINE DRIVER

BACKGROUND OF THE INVENTION

The present invention relates generally to electronic amplifiers and in particular, to balanced line drivers, i.e. amplifiers for driving balanced lines such as telephone loops.

In many telephone and other communication systems, a balanced line driver must be designed to meet exacting requirements in such areas as harmonic distortion, return loss and longitudinal balance. In the past, these design requirements have been fulfilled in generally satisfactory fashion by utilizing, for example, transformer output circuitry. However, the bulk and expense of transformer circuitry has rendered the use thereof increasingly undesirable.

Accordingly, transformerless balanced line drivers have been devised. In the typical arrangement, each side of the balanced line - a telephone loop, for example - is driven by a transistor output stage associated therewith. Current flows from one of the output stages through the load and into the other output stage. Thus the output currents of the two output stages are constrained to be substantially equal. Accordingly, it is important that the input signal to each output stage be just equal to that which would be necessary to provide equal currents on both sides of the balanced line if they were not already constrained to be equal. Otherwise, one or both of the output stages will operate nonlinearly, causing imbalance in the output voltages between the respective sides of the balanced line and ground. Harmonic distortion of the output signal then results.

In the known arrangements, the two output stages are driven independently of each other from a common input circuit responsive to the line driver input signal. Thus in order to minimize harmonic distortion generated as described above, the characteristics of the two output stages must be precisely matched. Precise matching of the output stages, however, can be a very difficult and/or costly task, especially when, as is often the case, the output stages comprise opposite conductivity type transistors.

SUMMARY OF THE INVENTION

Accordingly, a general object of the present invention is to provide an improved balanced line driver and in particular, to provide a balanced line driver which does not include transformer circuitry.

A more specific object of the invention is to provide a transformerless balanced line driver which has low harmonic distortion but does not require the output transistor pair to be closely matched.

Another object of the invention is to provide a transformerless balanced line driver which has high return loss and good longitudinal balance.

In a transformerless balanced line driver having first and second output stages for driving respective sides of the line, these and other objects are achieved in accordance with the invention by circuitry establishing a master-slave relationship between the first and second output stages respectively. The line driver input signal is fed only to the first output stage. Thus the current on a first side of the balanced line, for example the RING lead of a telephone loop, is generated directly in response to the input signal while the current on the second side of the balanced line, i.e. the TIP lead of the loop, is generated in response to the current on the first side thereof. As a result of this master-slave relationship, the signal fed to the second output stage can be assured to be precisely equal to that which would be necessary to make the TIP current equal to the RING current if the two of them were not, as discussed above, already constrained to be equal. Thus, well-balanced output signals between TIP and ground and between RING and ground are provided, and low harmonic distortion of the output signal is assured without requiring the first and second output stages to be closely matched.

In accordance with a feature of the invention, current repeater circuitry of a known type may be employed to establish the master-slave relationship described above. In a specific embodiment of the invention utilized to drive a telephone loop, the current repeater circuitry illustratively includes the RING and TIP output stages as its own input and output stages, respectively.

In the illustrative embodiment, the biasing circuitry for the RING and TIP output stages may provide each stage with a very high output impedance. Thus, an impedance matching network can be bridged across the line to precisely match the a.c. output impedance of the driver to the load, thereby advantageously providing high return loss. In addition, the very high RING and TIP output impedances facilitate longitudinal balancing of the line inasmuch as a balancing resistor connected between one side of the line and a.c. ground to equalize the impedance seen from each side of the line to ground, may then itself be rather large. Hence a relatively coarse adjustment of the balancing resistor is generally all that will be needed to meet a rather stringent longitudinal balance requirement.

BRIEF DESCRIPTION OF THE DRAWING

The invention may be clearly understood from the following detailed description and accompanying drawing in which the sole FIGURE depicts a balanced line driver embodying the principles of the present invention.

DETAILED DESCRIPTION

In the drawing, balanced line driver 10 receives an unbalanced input signal at input terminal N and provides a balanced output signal on output leads R and T. Output leads R and T are illustratively the RING and TIP of a telephone loop between which a load L is connected. An impedance matching network such as that comprising resistor R12 and capacitor C2 is also typically connected between leads R and T. The respective output currents on leads R and T are denoted $I_R$ and $I_T$. These currents are constrained to be equal since substantially all of the current provided by driver 10 on lead T is drawn back into the driver on lead R.

Driver 10 includes input transistor Q1 and opposite conductivity type output transistors Q3 and Q5. Substantially all of output current $I_R$ flows into the collector of output transistor Q3. A small amount thereof flows into longitudinal balancing resistor R6. Output current $I_T$ is provided from the collector of output transistor Q5.

Input transistor Q1 feeds the input signal at terminal N to output transistor Q3 while in accordance with the invention, circuitry including transistor Q2, Q4 and Q6 establishes a master-slave relationship between output transistors Q3 and Q5, respectively. Thus output current $I_R$ is generated by output transistor Q3 is response to the signal at input terminal N, while output current $I_T$ is generated by output transistor Q5 in response to output current $I_R$. The signal fed to output transistor Q5 can thus be assured to be neither no more nor no less than that which would be necessary to make output current $I_T$ equal to output current $I_R$ if they were not already constrained to be equal. Thus advantageously, good output signal balance and hence low harmonic distortion of the output signals are assured.

More particularly, the input signal at terminal N is extended to the base of input transistor Q1 via an input network comprising capacitor C1 and resistor R1. The value of the latter may be selected to determine the overall gain of driver 10. An appropriate operating point for input transistor Q1 is provided by bias resistors R2 and R3. Collector resistor R4 is illustratively provided to drop some of the supply voltage which would otherwise appear between the collector and base of transistor Q1. The output of transistor Q1 is taken at its emitter, which is connected to the base of output transistor Q3.

The emitter of output transistor Q3 is connected to $V_{EE}$ via emitter resistor R7. Output transistor Q3 amplifies the signal provided at its base by transistor Q1, thereby generating output current $I_R$ on lead R.

In accordance with a feature of the invention, the master-slave relationship between output transistors Q3 and Q5 is provided by current repeater circuitry which, as mentioned above, includes transistors Q2, Q4 and Q6 and which further illustratively includes output transistors Q3 and Q5 themselves. A current repeater is a circuit which provides an output current which precisely follows an input current applied thereto. The collector of output transistor Q3 serves as the input lead of the current repeater while the collector of output transistor Q5 serves as the output lead thereof.

The current repeater circuitry in driver 10 is comprised of two current repeater stages of known types. The first current repeater stage includes transistor Q2 and output transistor Q3, which are both illustratively of the npn type. The base of transistor Q2 is connected to the base of output transistor Q3 while its emitter is connected to $V_{EE}$ via resistor R5. Base current for both transistors Q2 and Q3 is thus provided from the emitter of transistor Q1.

The magnitude of the collector current of transistor Q2 is a predetermined fraction of the magnitude of the collector current of output transistor Q3. That fraction, which will be appreciated to be the current gain of the first repeater stage, is substantially equal to the ratio of the magnitude of resistor R7 to that of resistor R5. The collector current of transistor Q2, which may be regarded as an "intermediate" current, serves as the output current of the first current repeater stage and as the input current to the second current repeater stage. This intermediate current is extended to the second current repeater stage via resistor R8.

The second current repeater stage includes transistor Q4, output transistor Q5 and transistor Q6. All three of these transistors are illustratively of the pnp type. The bases of transistors Q4 and Q5 are interconnected. Their emitters are connected to ground via resistors R9 and R11 respectively. The base of transistor Q6 is connected to the collector of transistor Q4 at point P while its emitter is connected in common to the bases of transistors Q4 and Q5. The collector of transistor Q6 is connected to $V_{EE}$ via resistor R13. Base current for transistors Q4 and Q5 is provided from $V_{EE}$ via resistor R13 and the emitter-collector path of transistor Q6. If desired, as for example when the betas of transistors Q4 and Q5 are relatively small, transistor Q6 may be replaced by a Darlington pair.

As indicated above, input current for the second current repeater stage comprises the collector current of transistor Q2, which current is extended to point P via resistor R8. The collector current of output transistor Q5, i.e. output current $I_T$, is equal to a predetermined multiple of the current provided to point P. That multiple, the current gain of the second current repeater stage, is substantially equal to the ratio of the magnitude of resistor R9 to that of resistor R11.

The magnitudes of resistors R5, R7, R9 and R11 are chosen such that the current gain of the first current repeater stage is substantially the reciprocal of the current gain of the second current repeater stage. Thus, the overall gain of the current repeater is virtually unity and the input signal at the base of output transistor Q5 is just precisely equal to that which would be necessary to make output current $I_T$ equal to output current $I_R$ (i.e. that sum of the currents in resistor R6 and the collector of transistor Q3) even if the two output currents were not already constrained to be equal. Thus the output voltage of transistor Q5, like that of output transistor Q3, is a linear function of its input signal and low harmonic distortion of the driver 10 balanced output signal is assured.

It will be appreciated that certain simplifying assumptions were made in the above analysis of driver 10. It was assumed, for example, that all of output current $I_R$ flows into the collector of output transistor Q3 when in fact, a small amount thereof flows into resistor R6. Thus, a final, in-circuit balancing of the driver will generally be necessary. This may be readily accomplished, for example, by temporarily connecting a balancing resistor, center tapped to $V_{EE}/2$, between leads R and T and adjusting the overall current repeater gain for equal-magnitude signal excursions between lead R and ground and lead T and ground. Illustratively, resistor R9 is shown as variable to effect this balancing adjustment.

In the illustrative embodiment, the biasing circuitry for the output transistors of the present line driver is arranged to provide the transistors with very high output impedances. Advantageously, a matching network having an impedance substantially equal to that of the load to be driven may then be bridged across the line. A precise a.c. output impedance match is thus achieved, assuring high return loss.

In particular, resistors R7 and R11 in the emitter legs of output transistors Q3 and Q5, respectively, increase even further the inherently high output impedances at the collectors of those transistors. Thus, an impedance matching network, illustratively comprising the serial combination of resistor R12 and capacitor C2, having an impedance advantageously equal to that of load L can be connected between leads R and T.

A further advantage of providing high output impedances for transistors Q3 and Q5 is that driver 10 is thereby provided with a supervisory, i.e. quiescent, current which is nearly independent of loop length and hence of loop impedance. This is particularly advantageous when, as is often the case, the specific loop to be driven is not determined until the driver is placed into operation in a particular telephone installation, for example.

Since output transistors Q3 and Q5 are of opposite conductivity types, they present slightly different impedances to leads R and T respectively. However, the output impedances of transistors Q3 and Q5 are very high with respect to the impedance of load L so that this small difference only slightly affects the longitudinal balance of the line. In some balanced line driver applications, however, it may be found that circuitry unrelated to the line driver itself may be connected between one or the other sides of the balanced line and ground, thereby upsetting the longitudinal balance. In telephone line circuits, for example, the hook status detector may present a shunting impedance between TIP and ground. In such cases, a longitudinal balancing resistor, such as resistor R6 connected between $V_{EE}$ and RING, for example, may be provided to restore longitudinal balance to the line. Since the output impedance of transistor Q3 is very high, longitudinal balancing resistor R6 may itself have a large value so that advantageously, a relatively coarse adjustment of resistor R6 is generally all that will be needed to meet rather stringent longitudinal balance requirements.

It will be appreciated that the specific embodiment of the invention disclosed herein is merely illustrative of the principles of the invention. Many and varied other arrangements in accordance with these principles may be made by those skilled in the art without departing from the spirit and scope of the invention.

I claim:

1. A driver for a balanced line comprising, first means responsive to an input signal for generating a first output current signal on one side of said balanced line, and second means for generating on the other side of said balanced line a second output current signal substantially equal to said first output current signal, and current repeater means including said second means and responsive to said first output current signal for generating said second output current signal, said current repeater means further including first current repeater stage means responsive to said first output current signal for generating an intermediate current signal and second current repeater stage means responsive to said intermediate signal for generating said second output current signal.

2. The driver of claim 1 wherein said first current repeater stage means includes first and second base-coupled transistors and means for connecting the collector of said first transistor to said one side of said balanced line; wherein said second current repeater stage means includes third and fourth base-coupled transistors and means for connecting the collector of said fourth transistor to said other side of said balanced line; and wherein said current repeater means further includes means for interconnecting the collectors of said second and third transistors.

3. The driver of claim 2 further comprising means for coupling said input signal to the bases of said first and second transistors.

4. A driver for a balanced line comprising first means responsive to an input signal for generating a first current on one side of said balanced line and second means responsive to said first current for generating a second current on the other side of said balanced line, said first generating means including a first transistor, means for coupling said input signal to an input terminal of said first transistor, means for coupling a common terminal of said first transistor to a source of potential, and means for coupling an output terminal of said first transistor to said one side of said balanced line, and wherein said second generating means includes a second transistor, means for connecting an input terminal of said second transistor to said input terminal of said first transistor, means for connecting a common terminal of said second transistor to said source of potential, and means responsive to an output current of said second transistor for generating said second current.

5. The driver of claim 4 wherein said input signal coupling means includes an input transistor, means for extending said input signal to the base of said input transistor, means for connecting the collector of said input transistor to a source of potential, and means for connecting the emitter of said input transistor to said input terminals of said first and second transistors.

6. A driver for a balanced line comprising first means responsive to an input signal for generating a first current on one side of said balanced line and second means responsive to said first current for generating a second current on the other side of said balanced line, said second generating means including first current repeater stage means responsive to said first current for generating an intermediate current and second current repeater stage means responsive to said intermediate current for generating said second current.

7. A driver for a balanced line comprising an input terminal, first and second transistors of a first conductivity type, means for providing substantially the same potential at the bases of said first and second transistors, means for coupling an input signal applied to said terminal to the bases of said first and second transistors, means for connecting the collector of said first transistor to one side of said balanced line, means for connecting the emitters of said first and second transistors to a first fixed potential, and means responsive to collector current of said second transistor for generating a current on the other side of said balanced line.

8. The driver of claim 10 wherein said generating means includes third and fourth base-coupled transistors of a second conductivity type, means for connecting the collector of said fourth transistor to said other side of said balanced line, means for connecting the emitters of said third and fourth transistors to a second fixed potential, and means for connecting the collector of said third transistor to the collector of said second transistor.

9. The driver of claim 8 wherein said generating means further comprises a fifth transistor, the emitter, base and collector of said fifth transistor being connected to the bases of said third and fourth transistors, the collector of said third transistor, and a fixed potential, respectively.

10. The driver of claim 7 wherein said coupling means includes an input transistor, the emitter, base and collector of said input transistor being connected to the bases of said first and second transistors, said input terminal, and said second fixed potential, respectively.

* * * * *